United States Patent [19]

Gardner et al.

[11] Patent Number: 4,467,431
[45] Date of Patent: Aug. 21, 1984

[54] APPARATUS AND METHOD FOR CONTROLLING THE SHEARS OF A GLASSWARE FORMING MACHINE

[75] Inventors: Edward B. Gardner, Bloomfield; Frederick W. Winzer, East Granby, both of Conn.

[73] Assignee: Emhart Industries, Inc., Farmington, Conn.

[21] Appl. No.: 353,717

[22] Filed: Mar. 1, 1982

[51] Int. Cl.³ ............................................. G06F 15/46
[52] U.S. Cl. .................................. 364/473; 364/142; 364/475; 364/476; 377/17; 65/174
[58] Field of Search ............... 364/167, 174, 473, 475, 364/476, 142, 143; 318/600, 601, 602, 603, 604, 626, 627; 83/72; 65/160, 174, DIG. 13; 377/17; 72/22

[56] References Cited

U.S. PATENT DOCUMENTS

| | | | |
|---|---|---|---|
| 3,445,640 | 5/1969 | Harrison et al. | 364/475 X |
| 3,633,395 | 1/1972 | Anderson | 72/22 |
| 3,701,113 | 10/1972 | Chace et al. | 364/172 X |
| 3,764,990 | 10/1973 | Brian | 364/142 X |
| 3,778,833 | 12/1973 | Castrovillo et al. | 377/3 X |
| 3,812,351 | 5/1974 | Coberley | 377/17 X |
| 3,874,205 | 4/1975 | Roch et al. | 364/142 X |
| 4,158,799 | 6/1979 | Cappel et al. | 318/603 X |
| 4,242,621 | 12/1980 | Spaulding | 364/142 X |
| 4,365,289 | 12/1982 | Small et al. | 364/143 |
| 4,401,930 | 8/1983 | Kato et al. | 364/142 X |

Primary Examiner—Joseph F. Ruggiero
Assistant Examiner—Allen MacDonald
Attorney, Agent, or Firm—Gene Warzecha

[57] ABSTRACT

A control system for controlling the operation of cyclically moving components, in particular the shears of a glassware forming machine. The control system incorporates sensors which produce signals representative of predetermined shear positions in each shear cycle. The signals provide feedback to control circuitry and are processed to control the operation of the shears in response to the sensor signals.

28 Claims, 16 Drawing Figures

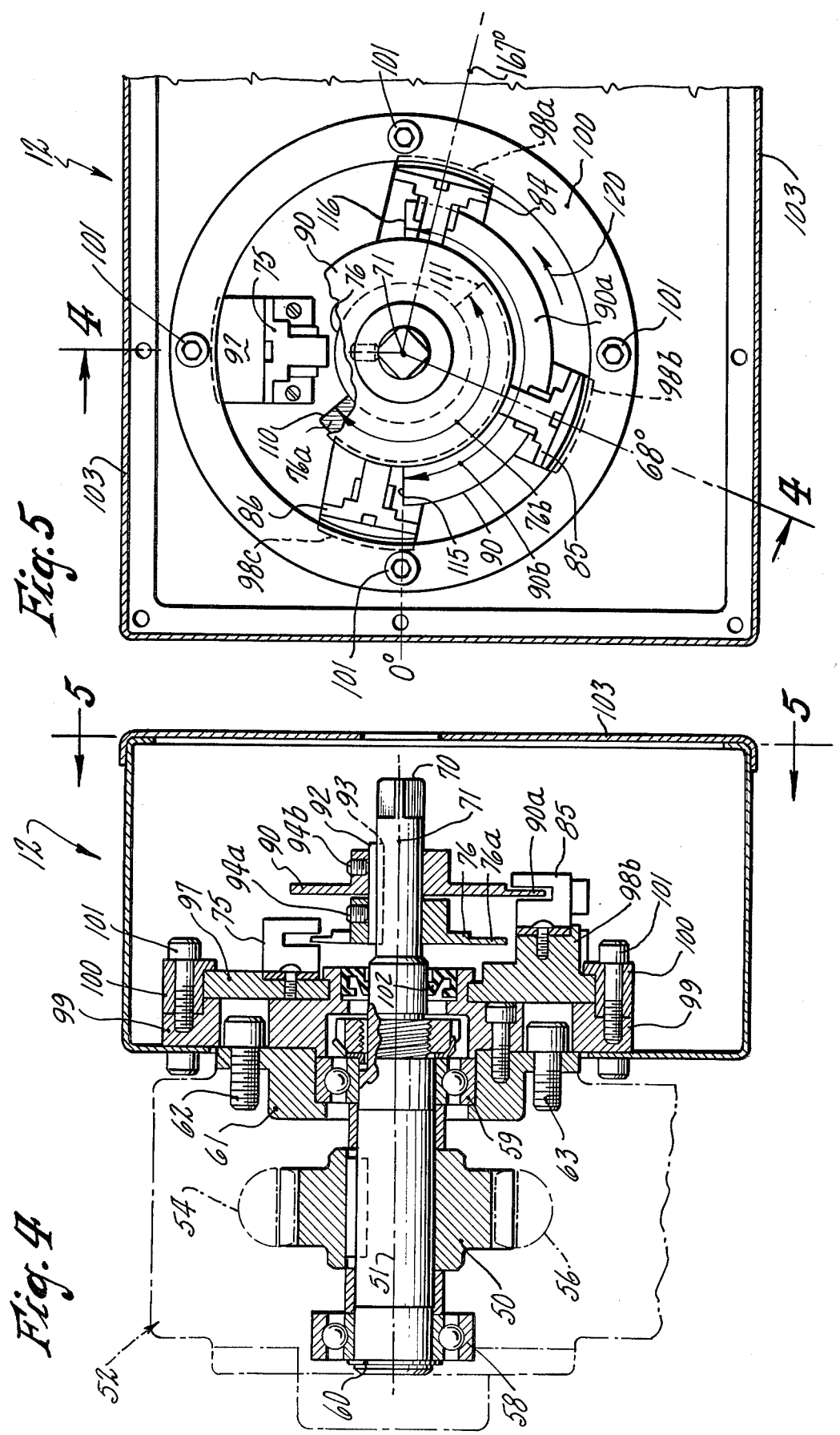

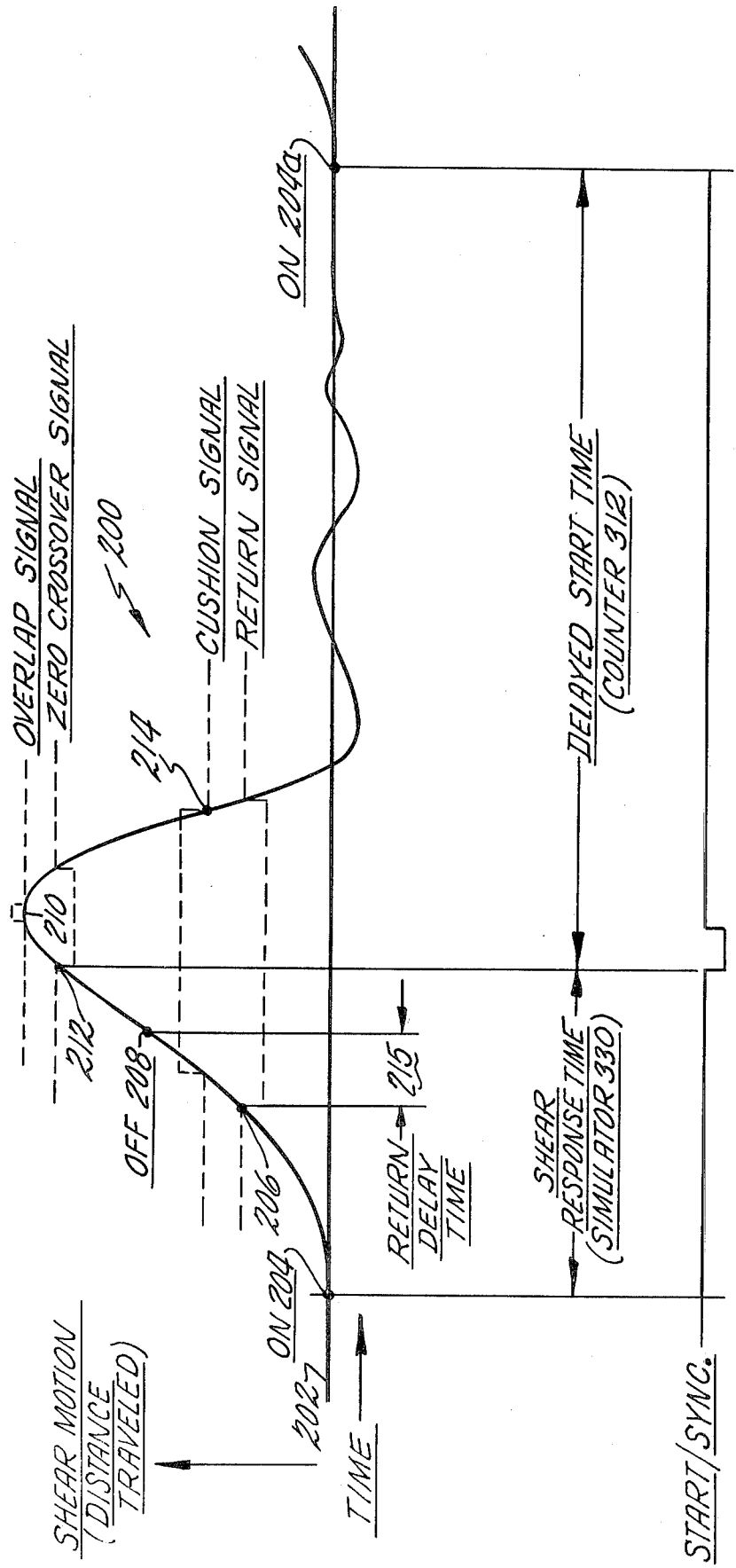

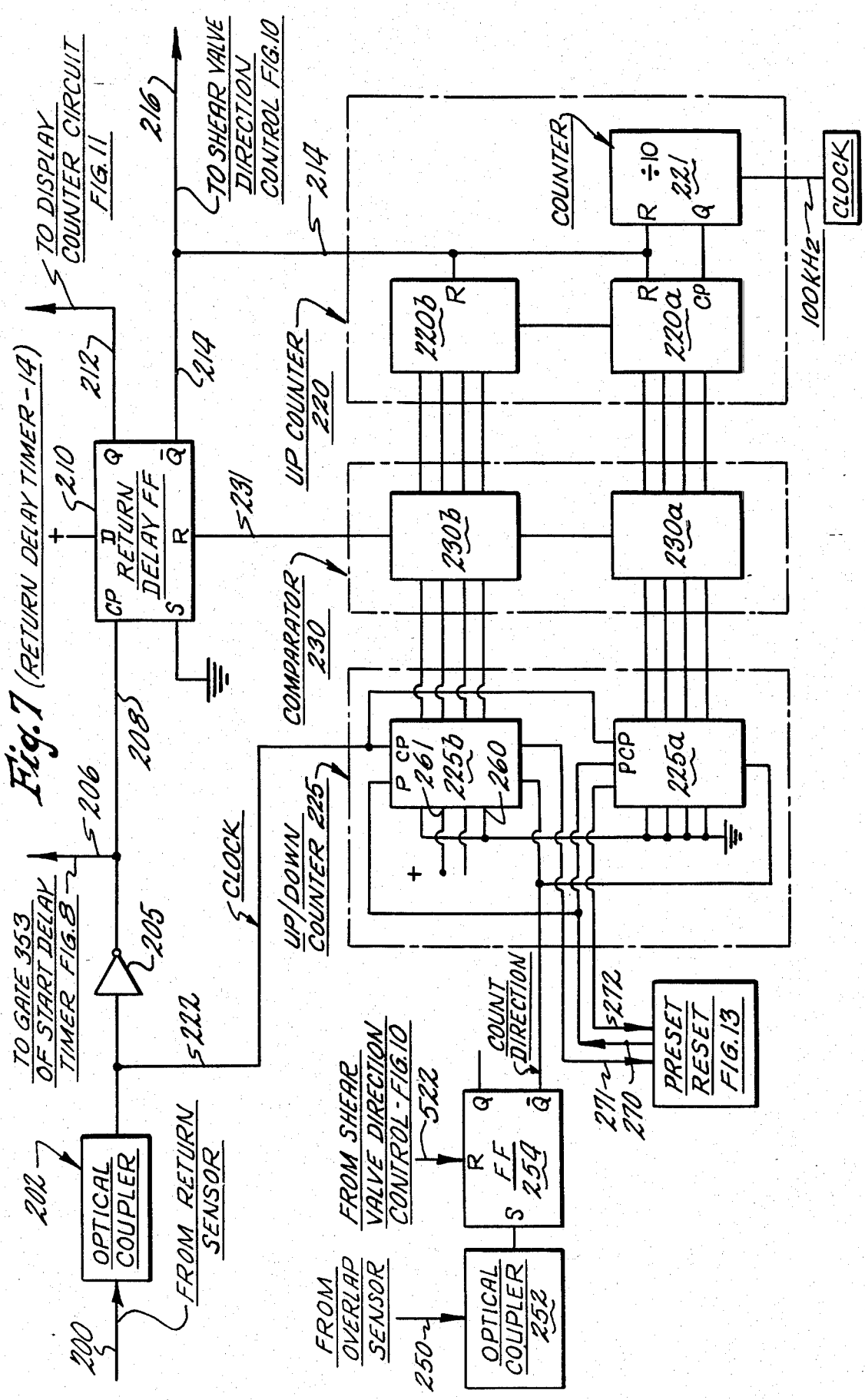

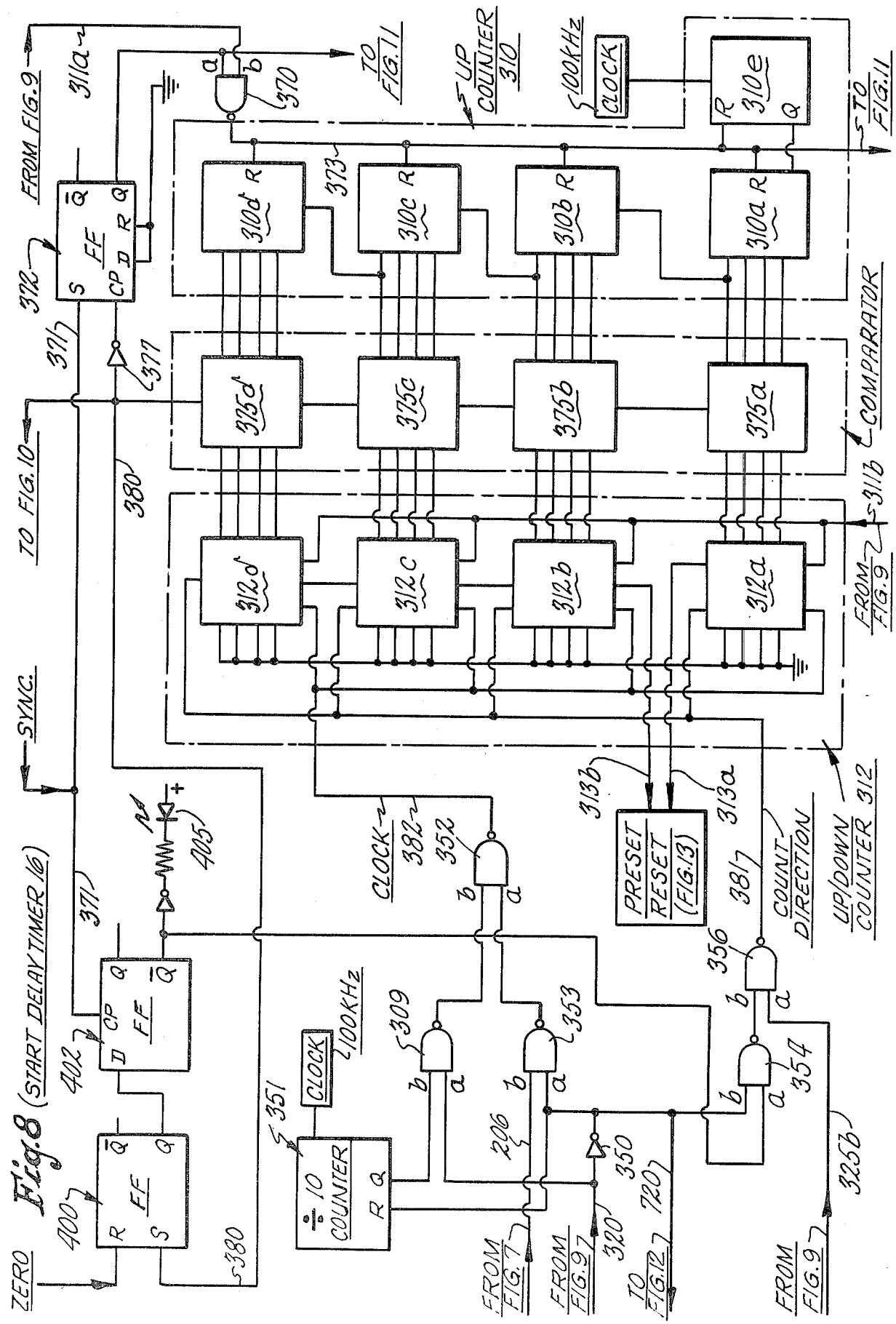

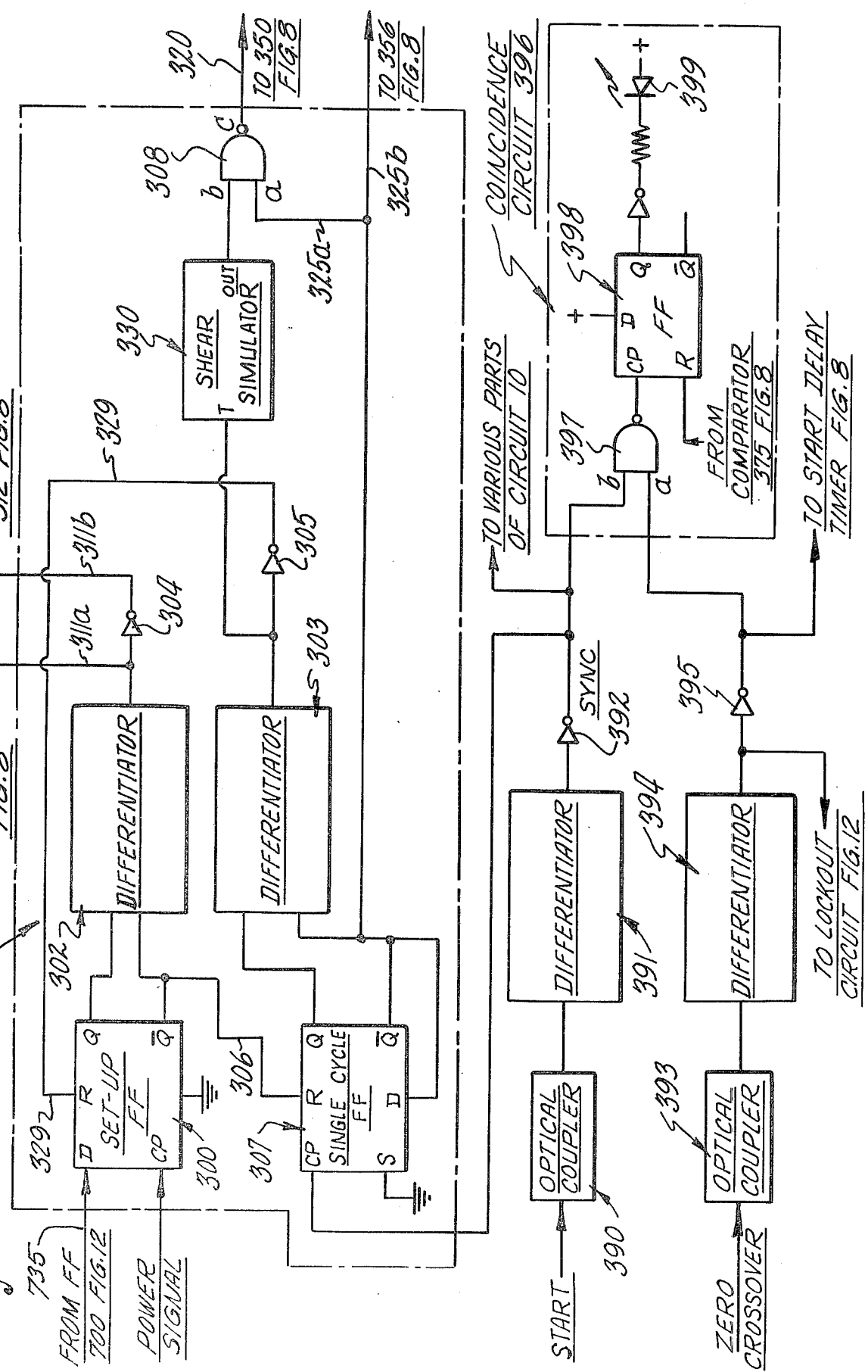

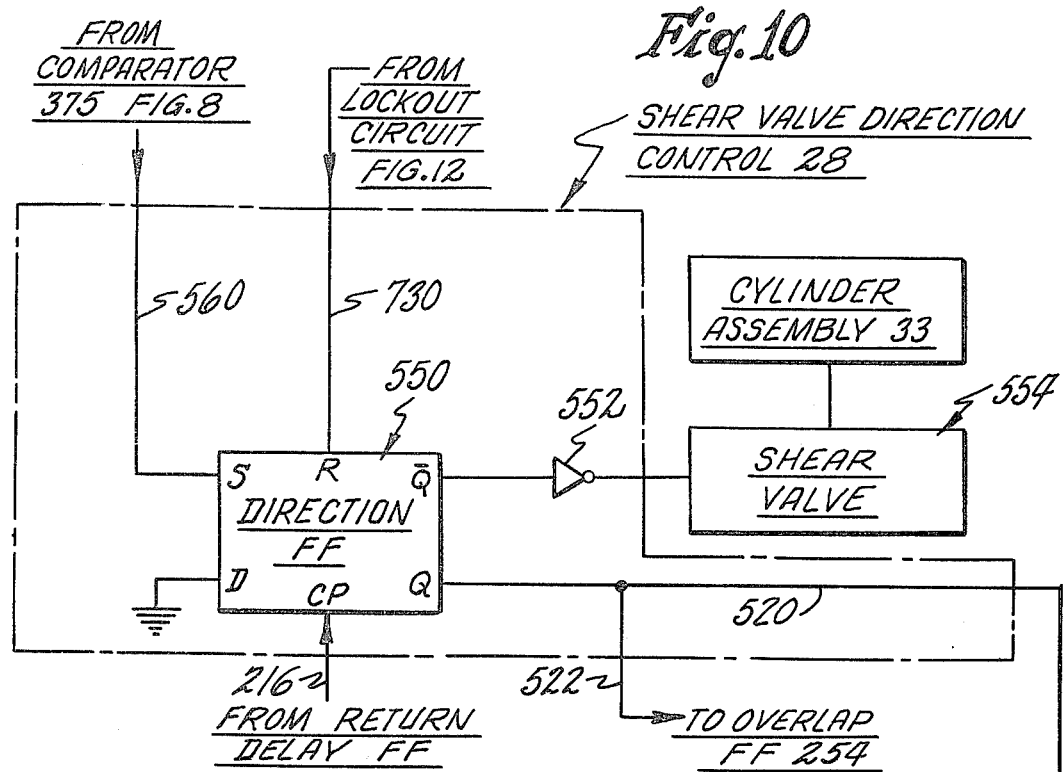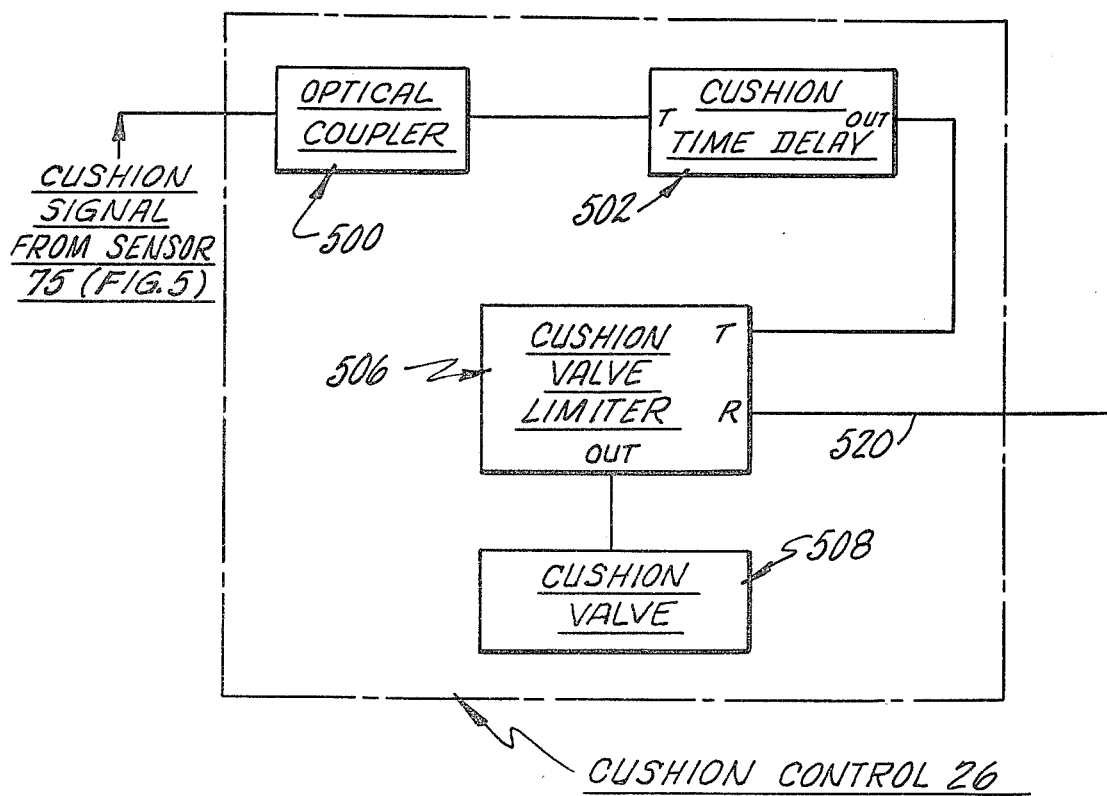
Fig. 10

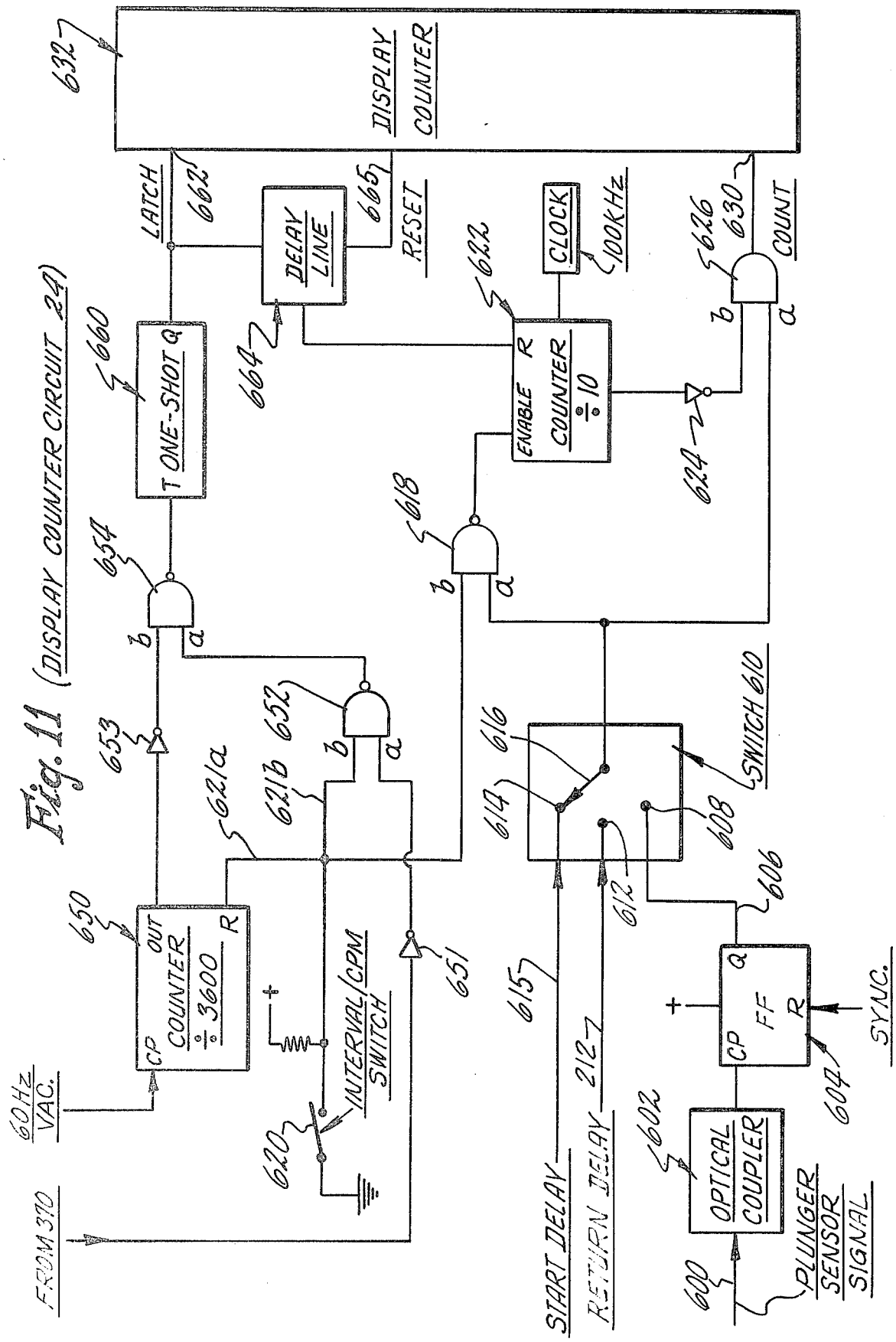

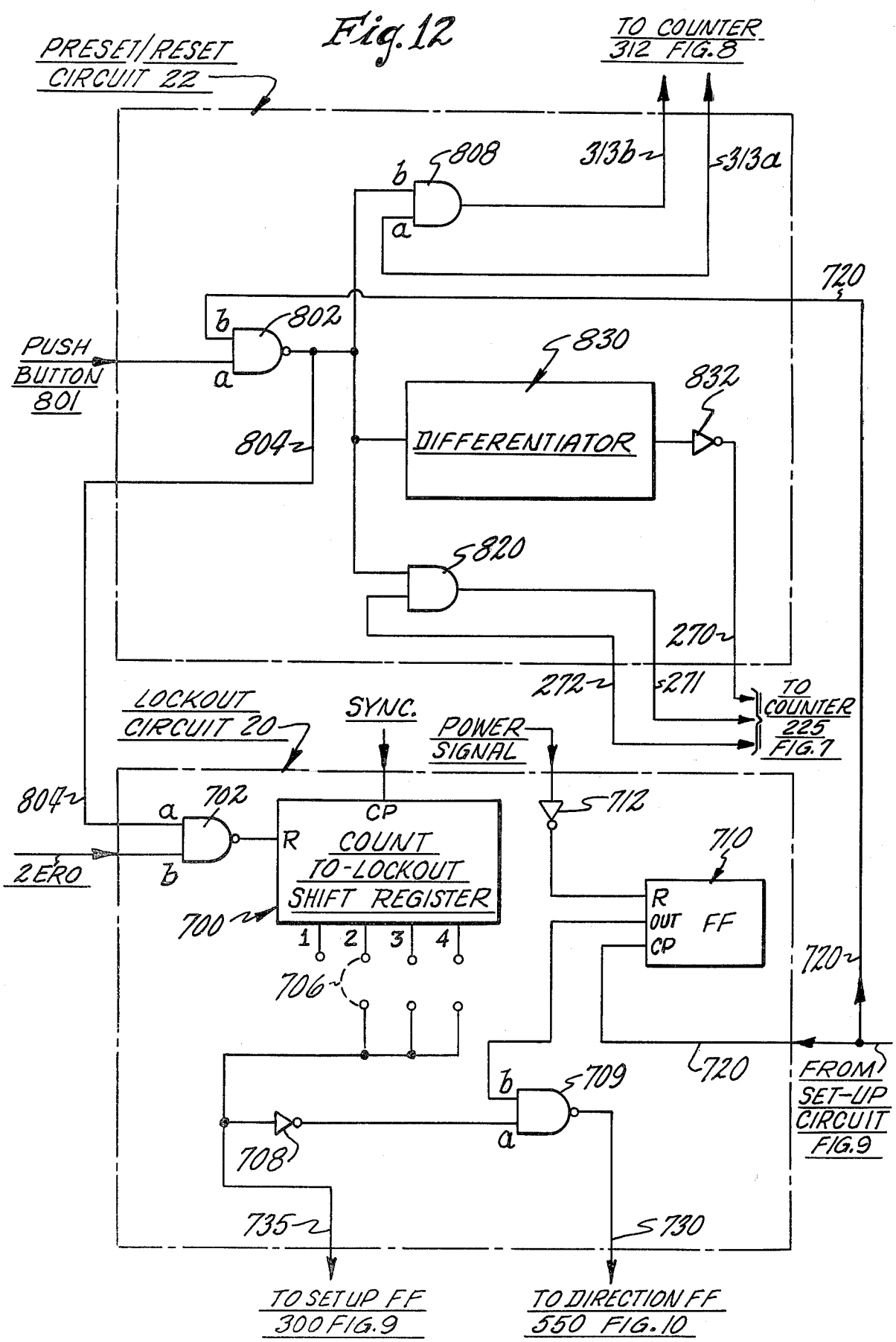

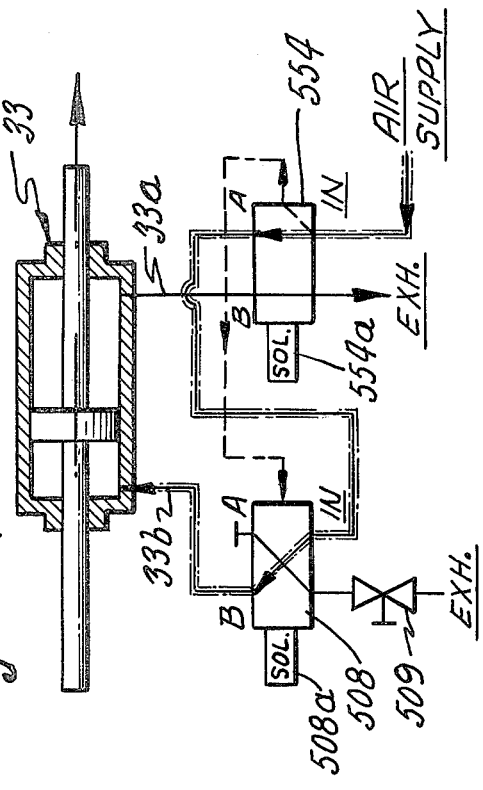
Fig.13b (INITIATE CUT STROKE)
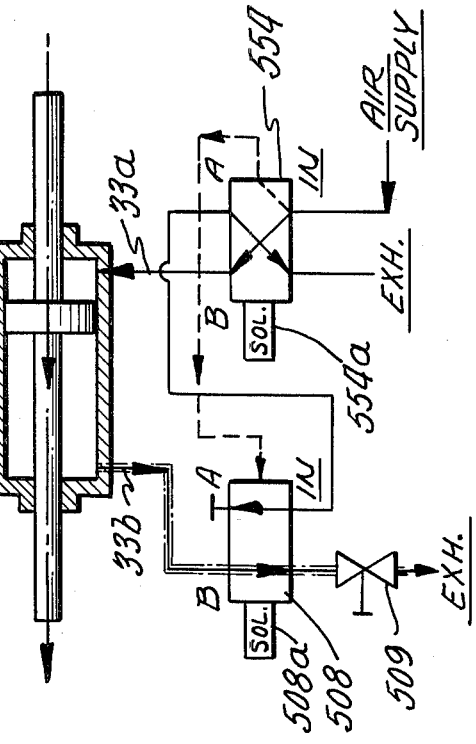
Fig.13d (CUSHION)
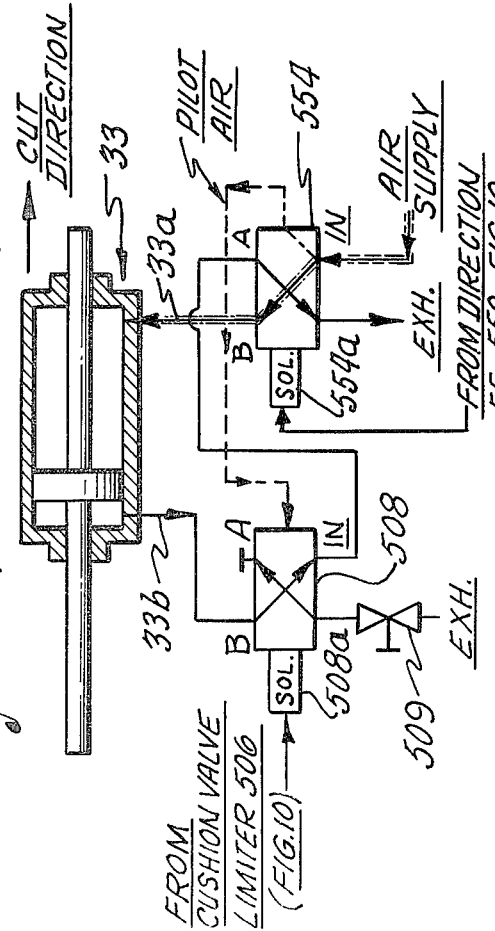
Fig.13a (SHEARS AT REST)
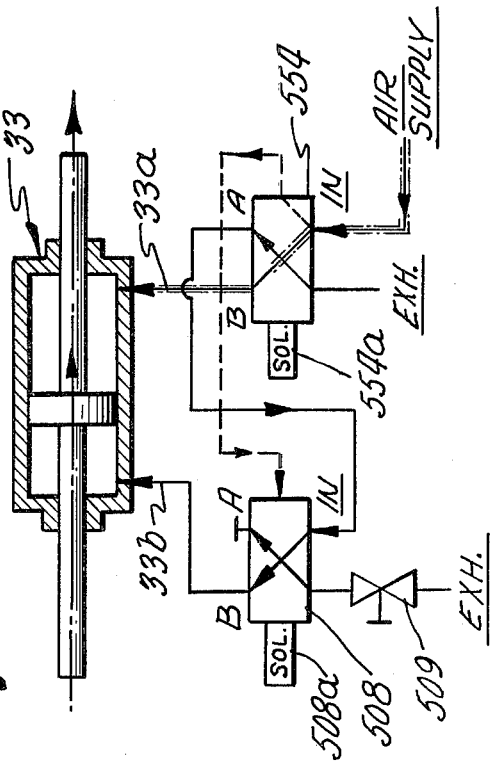
Fig.13c (END OF RETURN DELAY TIME)

APPARATUS AND METHOD FOR CONTROLLING THE SHEARS OF A GLASSWARE FORMING MACHINE

BACKGROUND OF THE INVENTION

1. Field of the Invention

The invention relates generally to control systems for controlling cyclical motion. More specifically, the invention relates to a control system for controlling straight-line shears for cutting gobs from a stream of molten glass in a glassware forming machine at a predetermined synchronized rate.

2. Description of the Prior Art

The use of shears for cutting gobs from a stream of molten glass falling from a feeder of a glassware forming machine is well-known in the prior art. Such shears are generally of either the arcuate or straight-line type, each type having a cyclically oscillating single pair of opposed blades associated with a single stream of molten glass. The blades of arcuate type shears are mounted at the ends of a pair of pivoted arms whereby the blades travel along an arc during their cycle. The straight-line type of shears are designed so the blades travel along a straight line during their cycle. An example of a prior art double gob shear assembly of the straight-line type is shown in U.S. Pat. No. 4,174,647, dated Nov. 20, 1979 and assigned to the assignee of the present invention.

Prior art shears of either the arcuate or straight-line type are generally activated by pneumatic (or fluidic) means interconnected in a complex arrangement of various valves and cylinders. The control and synchronization of prior art shears is also generally achieved by pneumatic (or fluidic) control means. An example of a pneumatic control arrangement is presented in the aforementioned U.S. patent.

Pneumatic control systems have a well-known susceptibility to several parameters such as air temperature and humidity, mechanical friction, mechanical wear, etc. As a result, the actual point in time at which the shears effect a cut of the molten stream into a gob is variable and a function of these parameters. Moreover, the numerous pneumatic valves used in these systems have slow response times which affect the motion of the shears so that the valves must be energized in anticipation of the desired shear motion. In view of these inherent characteristics of pneumatic control systems precise synchronization of the shears has been difficult to achieve and maintain for any length of time. Furthermore, the speed of the shears has been limited because of the inability of pneumatic control systems to react faster then at a predetermined rate.

It is an object of the present invention to provide a control system for cyclical motion. Another object of this invention is to provide a shear control system. A still further object of this invention is to provide a control system for synchronizing shear operation within a predetermined range regardless of changes in ambient parameters such as air temperature and humidity and mechanical friction and wear.

SUMMARY OF THE INVENTION

These and other objects of the invention are achieved by a preferred embodiment disclosed herein which is a control system for controlling the cyclical operation of shears comprising: sync means for providing a synchronizing signal in each cycle of operation of said shears, said synchronizing signal occurring at a predetermined first time in each cycle; start timer means responsive to said sync pulse for producing a start signal output at a predetermined second time in each cycle; means responsive to said start signal for energizing said shears to cause them to move toward each other; return sensor means for sensing the position of at least one of said shears and for producing a return signal output when said shears are at a first predetermined position in each cycle; return timer means responsive to said return signal output and operatively connected to said energizing means for producing a return delay signal output at a predetermined third time for de-energizing said energizing means. The control system further comprises an overlap sensor means and first adjusting means for adjusting said predetermined third time, and a zero crossover sensor means and second adjusting means for adjusting said predetermined second time. The control system further comprises a cushion sensor means and means responsive thereto for cushioning the return stroke of the shears.

The invention also comprises a method for controlling the operation of shears relative to a sync signal, said shears being cyclically driven by a fluidic cylinder assembly, said method comprising the steps of:

a. energizing said cylinder assembly to cause movement of said shears toward each other at a predetermined first time relative to said sync signal;

b. sensing a second time when at least one of said shears is at a first predetermined position in its cycle;

c. determining a return delay time period after said second time;

d. de-energizing said cylinder assembly upon the expiration of said return delay time period to urge said shears away from each other;

e. repeating steps a through d.

The method further comprises the steps of:

f. sensing the occurrence of a predetermined overlap of said shears;

g. producing a first signal output upon the occurrence of said overlap;

h. adjusting said return delay time period by a first predetermined amount in the event said first signal is not produced or adjusting said return delay time period by a second predetermined amount in the event said first signal is produced;

i. repeating steps a through h.

Another feature of the method further comprises the steps of:

j. sensing the occurrence of the zero crossover point of said shears;

k. producing a second signal upon the occurrence of said zero crossover point;

l. determining if said second signal occurs before, after or concurrently with said sync signal;

m. adjusting said predetermined first time by a third predetermined amount in the event said second signal occurs before said sync signal or adjusting said predetermined first time by a fourth predetermined amount in the event said second signal occurs after said sync signal;

n. repeating steps a through m.

Yet another feature of the method further comprises the steps of:

o. sensing the occurrence of a second predetermined position of said shears on the return stroke thereof;

p. producing a third signal upon the occurrence of said second predetermined position;

q. energizing a cushion valve in response to said third signal to cushion said shears on said return stroke;

r. repeating steps a through q.

BRIEF DESCRIPTION OF THE DRAWINGS

FIG. 4 is a cross-sectional view of the sensor housing and part of the prior art shear assembly taken along the lines 4—4 of FIG. 2;

FIG. 5 is a front elevational view of the sensor housing taken along the lines 5—5 of FIG. 4;

FIG. 6 is a graph of the shear blade motion vs. time;

FIG. 7 is a schematic of the return delay timer shown in FIG. 1;

FIG. 8 is a schematic of the start delay timer shown in FIG. 1;

FIG. 9 is a schematic of the setup circuit shown in FIG. 1 and shows the coincidence circuit and other features of the invention;

FIG. 10 is a schematic of the cushion control circuit and shear valve direction control shown in FIG. 1;

FIG. 11 is a schematic of the display counter circuit shown in FIG. 1;

FIG. 12 is a schematic of the lockout circuit and preset/reset circuit shown in FIG. 1;

FIGS. 13a, b, c and d are diagrammatic representations of a portion of the invention at various stages during the shear cycle.

DESCRIPTION OF THE PREFERRED EMBODIMENT

Figure 1:
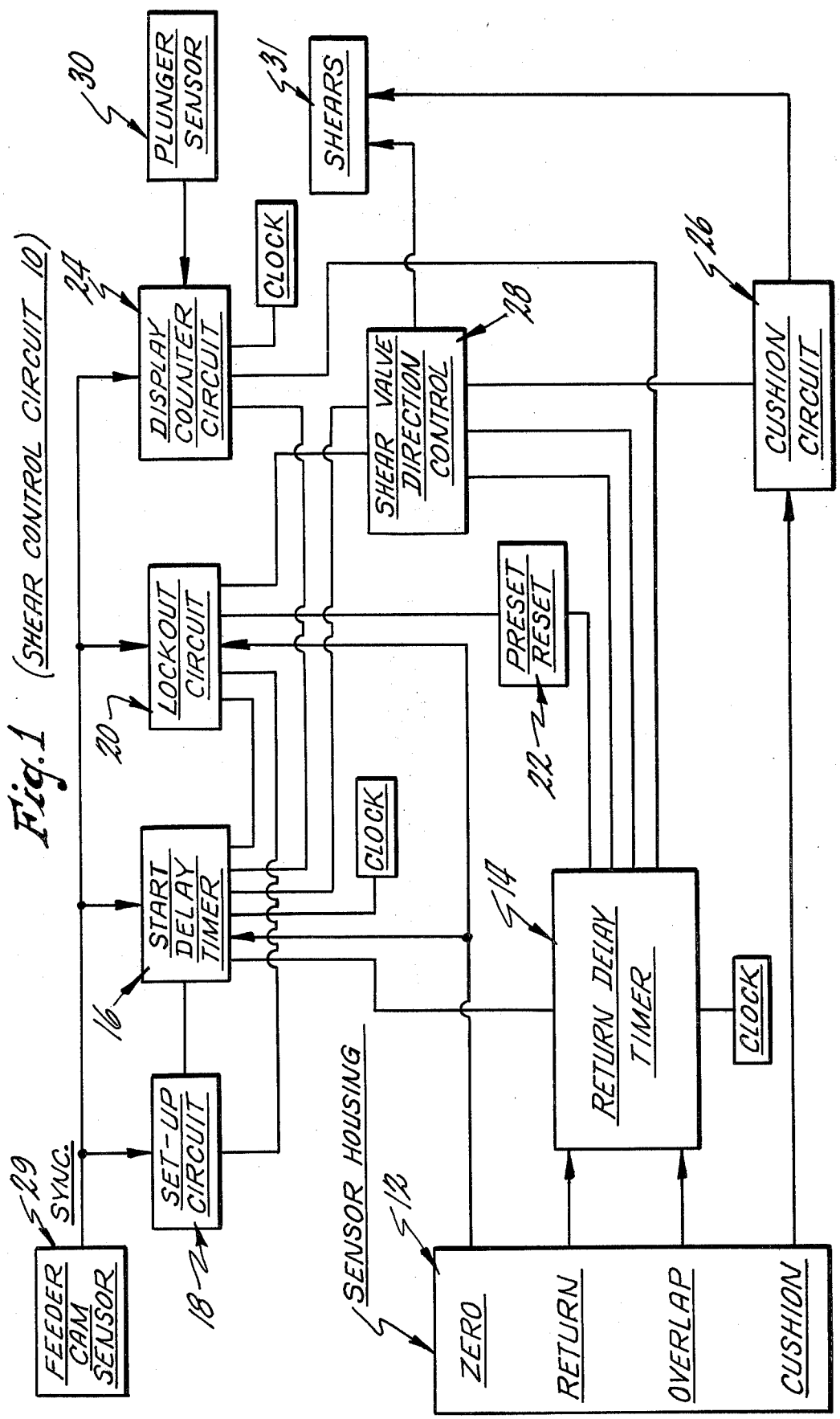
FIG. 1 is an overall block diagram of the shear control circuit according to the present invention.

Referring now to FIG. 1 there is shown an overall block diagram of shear control circuit 10 and its relationship to various inputs and outputs. To facilitate explanation, FIG. 1 is herein divided into several component parts interconnected as shown: sensor housing 12, return delay timer 14, start delay timer 16, setup circuit 18, lockout circuit 20, preset/reset circuit 22, display counter 24, cushion circuit 26, shear valve direction control 28, feeder cam sensor 29, plunger sensor 30, and shears 31.

Figure 2:
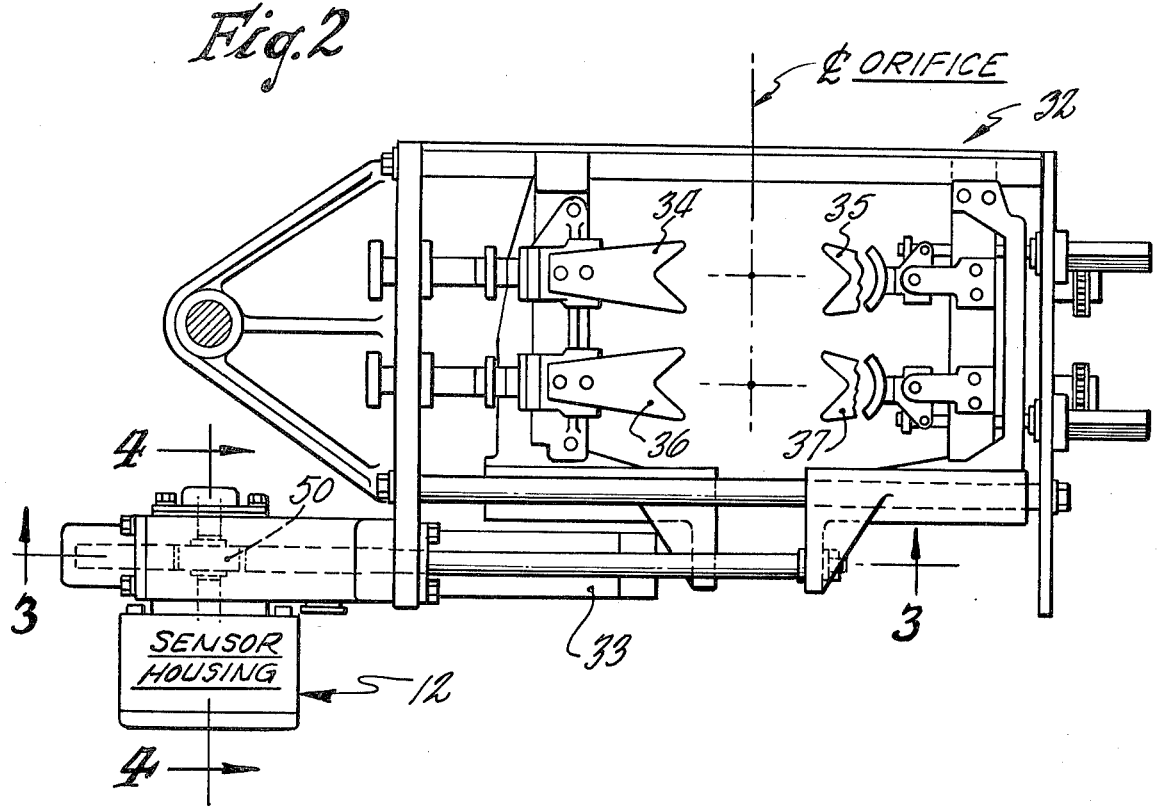
FIG. 2 is a plan view of one embodiment of prior art straight-line shear assembly together with the sensor housing of the shear control circuit of FIG. 1.

Shear control circuit 10 is designed for controlling the timing of a straight-line shear assembly of the type shown in FIG. 2. FIG. 2 is a diagrammatic plan view of a prior art straight-line shear assembly 32 which is more specifically described in the aforementioned U.S. Pat. No. 4,174,647. While shear assembly 32 is shown having two sets of opposed shears 34-35 and 36-37 for double gob operation, it will be understood by those skilled in the art that the present invention is suitable for use with a straight-line shear assembly containing any number of pairs of opposed straight line shears. It will also be understood that the invention may be adapted for use with arcuate type shears. Sensor housing 12 shown in FIG. 2 provides the source for various sensor input signals utilized within shear control circuit 10.

Figure 3:
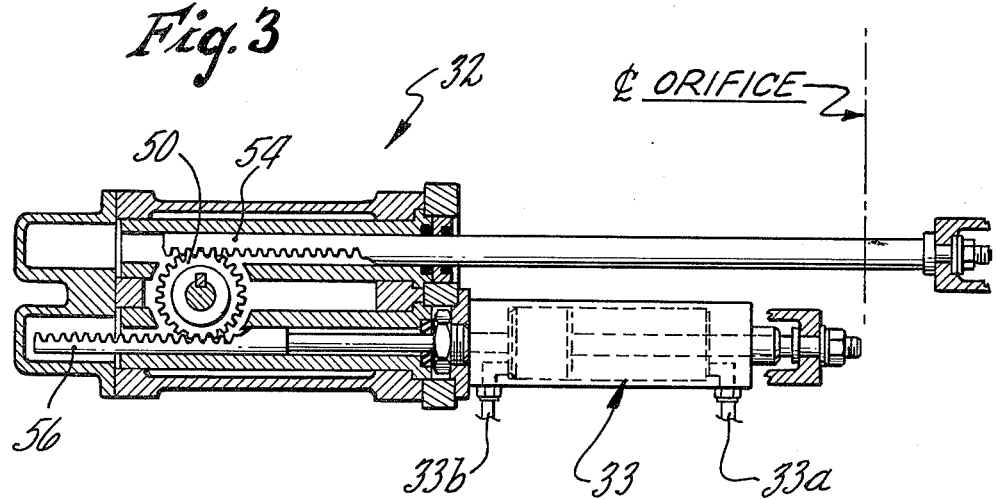
FIG. 3 is a view of FIG. 2, with a different scale factor, taken along the lines 3—3.

FIG. 3 is a view of FIG. 2 taken along the line 3—3 partly in cross-section. FIGS. 2 and 3 are drawn to different scales but are each associated with the center line of the feeder orifice. As will be understood below with reference to FIG. 4, pinion 50 of shear assembly 32 constitutes the means by which the oscillatory linear motion of the straight line shears is translated to oscillatory rotary motion of various members within sensor housing 12. Cylinder assembly 33 is a pneumatically activated cylinder controlled by valve means (best seen in FIG. 13) which regulate air in lines 33a and 33b.

FIG. 4 shows a cross-sectional view of sensor housing 12 and part of prior art shear assembly 32 taken along lines 4—4 of FIGS. 2 and 5. Housing 52 of shear assembly 32 contains rack rods 54 and 56 having pinion 50 interposed therebetween. Pinion 50 is supported by bearings 58 and 59 which are retained by retainer ring 60 and bearing retainer 61. Sensor housing 12 is mounted to bearing retainer 61 by screws 62 and 63. Sensor housing 12 contains a shaft 70 and is mounted for rotation with pinion 50 with its axis 71 in alignment with pinion axis 51.

Referring to FIGS. 4 and 5 (a front elevational view taken along the line 5—5 of FIG. 4) it will be noted that sensor housing 12 includes four sensors: cushion control sensor 75, zero crossover sensor 84, return signal sensor 85 and overlap sensor 86. Sensor 75 is mounted for mateable engagement with inside sensor vane 76 while sensors 84, 85 and 86 are mounted for mateable engagement with outside sensor vane 90. Each of the sensor vanes is secured to shaft 70 by means of set screws 94a and 94b, key 92 and slot 93. Sensor 75 is mounted to inside sensor block 97 while sensors 84, 85 and 86 are mounted to outside sensor mounting blocks 98a, 98b and 98c respectively, all mounting blocks being secured to sensor plate 99 by clamp ring 100 and holding screws 101. Seal 102 and cover 103 are provided to seal the interior of housing 12. Electrical connections between the sensors and other components of shear control circuit 10 are omitted from FIGS. 4 and 5 for the sake of clarity.

Inside sensor vane 76 is used to activate cushion sensor 75 and outside sensor vane 90 is used to activate sensors 84, 85 and 86. Each sensor is mounted at such a radial distance from axis 71 as to mate with the sensor vane which it is to be activated with. In the preferred embodiment the sensors are Hall-effect sensors which sense the passage of an edge of conductive material past the sensor. Each sensor vane 76 and 90 has an arcuate portion or flange 76a and 90a, respectively. Arcuate portion 76a has some predetermined arcuate length 76b between radially extending edges 110 and 111 and portion 90a has some predetermined length 90b between radially extending edges 115 and 116.

Referring to FIGS. 5 and 6, the operation of the various sensors 75, 84, 85 and 86 will be described assuming the shear cutting stroke occurs in a direction corresponding to direction 120. FIG. 6 shows a graphical profile 200 of one cycle of the linear motion of one shear blade (the other is a mirror image) vs time. The sensors and vanes are arranged about axis 71 to produce signal outputs of various points on graph 200. The shape of graph 200 is dependent upon many variables such as temperature, friction, etc., and is not intended to represent shear motion under all conditions. The relative positions of sensors 75, 84, 85 and 86 and vane flanges 76a and 90a shown in FIG. 5 represent the base-line or equilibrium position of the shears equivalent to line 202 on graph 200.

In the preferred embodiment arcuate lengths 76b and 90b are chosen to be 180° and the relative angular positions of the sensors is established during an alignment procedure when shear control circuit 10 is first integrated with the straight-line shear assembly to be controlled. For explanation purposes the relative angular positions of the sensors are approximated herein with respect to a zero degree (equilibrium) reference angle best seen in FIG. 5. At some point in time 204 the cutting stroke of the shears is initiated by energizing cylinder assembly 33 (best seen in FIG. 3) causing the shears to move toward each other. At another point in time 206 (approximately 68° into the cut stroke) return sensor 85 produces the leading edge of a return signal when it senses edge 115. Shear control circuit 10 produces an "off" signal at point 208 to de-energize or reverse the shears which will then inertially follow through the rest of the cycle. It will be understood that for cyclic operation to continue the shears are driven in each direction and the "off" signal at point 208 actually serves to reverse the pressure at the ports of cylinder assembly 33 to urge the shears away from each other at point 208. However, because of the inertia of the mechanical components and the inherent lag in fluidic drives there is no actual reverse motion of the shears until some time later (i.e. after overlap point 210) even though cylinder 33 is pressurized to urge or try to move the shears in the reverse direction. Zero crossover sensor 84 produces the leading edge of a zero crossover signal when it senses edge 115 at zero point 212 (approximately 167° into the cut stroke). Overlap sensor 86 produces an overlap signal when it senses edge 116 at overlap point 210 (approximately 169° into the cut stroke). At this point the shear motion is reversed and the sensor vanes begin to rotate in the opposite direction. During this return stroke cushion sensor 75 produces the trailing edge of a cushion signal when it senses edge 111 (approximately 29° into the return stroke). (It will be noted the leading edge of the cushion signal occurs prior to the zero crossover signal.)

The arcuate lengths 76b and 90b of the vane flanges and the relative positions of the sensors are chosen so each sensor is activated by its corresponding vane edge once per shear cycle. Thus, each of the signals from the sensors is a pulse having a duration equal to the time the shear position remains above the signal point on graph 200. The various signals are superimposed in phantom on graph 200, the return and zero crossover signals are chosen to be negative pulses and the cushion and overlap signals chosen to be positive pulses. These choices are arbitrary since as will be understood below shear control circuit 10 may be designed to respond to either the rising or falling edge of any one signal. While the preferred embodiment utilizes two separate vane flanges spaced axially along shaft 70, any number of flanges may be used provided appropriate sensor outputs may be obtained. (The two flanges may be considered as one because they are fixed relative to each other.)

It should be mentioned here that the start/sync signal shown in FIG. 6 has a variable length depending upon the speed of the machine feeding material to the shears. As will be seen below the leading edge of this signal tends to align with the leading edge of the zero crossover signal.

During the initial alignment of shear control circuit 10 with a particular shear assembly, sensor 84 is aligned so the zero crossover signal occurs at the point on the shear cut when there is no gap between the opposed blades. This provides a well defined reference point. Similarly sensor 86 is aligned to produce the overlap signal at the furthermost point of travel of the shear blades. As will be understood below, alignment of return sensor 85 and cushion sensor 75 only requires that they produce output signals on the cut and return strokes, respectively, although the return sensor output must occur before the turn-off point 208.

Those skilled in the art will understand that the duration of energization of cylinder assembly 33, i.e. the time between points 204 and 208, controls the extent of shear travel, an insufficient energization time being incapable of causing the shears to reach the overlap point 210. As stated above, shear control circuit 10 determines the point 208 at which cylinder assembly 33 must be reversed in order for the shears to just reach point 210. The time period between points 206 and 208, return delay time 215, determines point 208.

Return delay time 215 is calculated by return delay timer 14 shown schematically in FIG. 7. Integrated circuit logic components well known to those of ordinary skill in the art are used in timer 14 and throughout shear control circuit 10. Consequently, most circuit details relating to biasing, impedance matching, driving requirements and the like are omitted herein. Timer 14 receives the return sensor signal output on line 200 and the overlap sensor signal output on line 250. The return sensor signal goes through optical coupler 202, the output of which is inverted by inverter 205. The output of inverter 205 is connected via line 206 to start delay timer 16 (best seen in FIG. 8) and via line 208 to return delay flip-flop 210. The Q output of flip-flop 210 is connected to display counter circuit 24 (best seen in FIG. 11) via line 212 and the OVS/Q/ output is connected via line 214 to the reset terminals of up counter 220 (having two 4-bit counters 220a and 220b and divide-by-10 counter 221) and via line 216 to shear valve direction control 28 (best seen in FIG. 10).

The non-inverted output of optical coupler 202 is connected via line 222 to up/down counter 225 (comprising two 4-bit counters 225a and 225b). When a return signal output occurs during a shear cycle the output of inverter 205 will go high, the Q output of flip-flop 210 will go high and the OVS/Q/ output goes low thus enabling up-counter 220 and divide-by-10 counter 221. Counter 221 is clocked by a 100 kHz clock source (as are other parts of circuit 10) thus producing a 10 kHz output connected to the clock input of counter 220a. It will be noted that up-counter 220 begins its count at point 206 on graph 200.

Comparator 230 (having two 4-bit comparators 230a and 230b) compares the counts in up/down counter 225 and up-counter 220 and produces an output on line 231 to reset flip-flop 210 upon a comparison, thereby causing its OVS/Q/ output to go high. As will be seen below this occurs at point 208 on graph 200 and causes shear valve direction control 28 to de-energize cylinder assembly 33. Simultaneously, up-counter 220 and divide-by-10 counter 221 are reset.

The count in up/down counter 225 is return delay time 215. In an initialization procedure a count of 96 is loaded into counter 225 via terminals 260 and 261 of counter 225b (representing the 32 and 64 count terminals respectively) which are connected together and to a positive source. This is the approximate mid-range of the 256 count capability of up/down counter 225 and expedites initialization of shear control circuit 10 by starting the count closer to the ultimate return delay time 215. (Another initial count may be entered if desired.) The relationship between up/down counter 225 and preset/reset circuit 22 on line 270, 271 and 272 will be explained below with reference to FIG. 12.

Once time 215 is approximately set the overlap sensor signal is utilized to command up/down counter 225 to increment or decrement in order to finally set and maintain time 215 within a narrow range. The overlap signal goes through optical coupler 252 the output of which is connected to the set terminal of flip-flop 254. The OVS/Q/ output of flip-flop 254 is connected to the direction terminals of up/down counter 225 to provide count direction: up when OVS/Q/ is high and down when OVS/Q/ is low. When an overlap signal occurs flip-flop 254 is set thereby producing a "count-down" command. As will be seen below, shear valve direction control 28 provides an output on line 522 to reset flip-flop 254 when cylinder assembly 33 is de-energized. This provides a "count-up" command to up/down counter 225. The actual count occurs when a positive going pulse is received on line 222, i.e. once per cycle at each pulse. It will thus be noted that the count in up/down counter 225 represents return delay time 215 which is decremented if an overlap signal occurs and incremented if an overlap does not occur. Under ideal conditions the count in up/down counter 225 will alternately increment and decrement one count on successive cycles to change return delay time 215 as a function of the overlap signal of the previous cycle. (In the preferred embodiment the time change or resolution will be 0.1 msec per cycle because of the 10 kHz clock counted by counter 220.)

In addition to the control of the shears by return delay time 215 to assure that a cut stroke is completed, shear control circuit 10 also determines the proper point 204 in the shear cycle at which the shears must be energized relative to a sync signal.

Referring now to FIGS. 8 and 9 there are shown schematics of start-delay timer 16 and set-up circuit 18 respectively. The operation of start-delay timer 16 is modified during a set-up or initialization procedure. The purpose of the set-up procedure is to approximate in the start timer the conditions (time) in effect during actual shear operation. As will be understood below, when power is first applied to shear control circuit 10 set-up flip-flop 300 is set by a high "power-on" signal at its clock terminal. This causes leading edge differentiator circuit 302 to have a negative pulse at its output which resets up-counter 310 via lines 311a and, via inverter 304 and line 311b resets up/down counter 312. Simultaneously, the low OVS/Q/ output of flip-flop 300 is connected via line 306 to the reset terminal of single cycle flip-flop 307 which may then be set by the occurrence of the next sync pulse at its clock terminal.

Single cycle flip-flop 307 is used to define a single cycle between the first two successive sync pulses following the high signal at the clock terminal of set-up flip-flop 300. The first sync pulse following the setting of flip-flop 300 sets flip-flop 307 producing a low OVS/Q/ output which is connected via line 325a to terminal a of gate 308 and via line 325b to terminal a of gate 356. (All gates referred to herein will be understood to be NAND gates unless otherwise noted.) As will be explained below, this low OVS/Q/ output caused by the first sync pulse causes a high output from gate 356 thereby providing a count-up command to up/down counter 312 on line 381. Simultaneously, the low OVS/Q/ output of flip-flop 307 causes a high output at terminal c of gate 308. The output of gate 308 is connected via line 320 to terminal a of gate 309, terminal b of which is connected to the 10 kHz output of divide-by-ten counter 351 which is driven by the 100 kHz clock. Gate 309 will then pass a 10 kHz clock to terminal b of gate 352. Terminal a of gate 352 will be high at this time (as will be seen below) and the 10 kHz clock will pass through gate 352 to the clock input of up/down counter 312.

Subsequently, the second sync pulse following "power-on" causes the Q and OVS/Q/ outputs of flip-flop 307 to toggle because its data and OVS/Q/ terminals are connected together. This toggling causes a negative pulse output from trailing edge differentiator 303 which is inverted by inverter 305 to reset flip-flop 300 via line 329 causing its OVS/Q/ output to go high thereby resetting flip-flop 307. Since a reset input normally overrides a clock input both flip-flops 300 and 307 operate only once and only during the set-up procedure. (Flip-flop 300 will be set until the second sync pulse following the high signal at its clock terminal.)

The negative pulse output of differentiator 303 caused by the second sync pulse also triggers shear simulator 330 which is a time delay circuit designed to provide a low output signal only during a predetermined variable time period. The output of simulator 330 is connected to terminal b of gate 308. Since terminal a is high at this time, the output of gate 308 will remain high for the duration of the time period set in simulator 30. This holds gate 309 open allowing the 10 kHz clock to pass to gate 352 thus presenting the 10 kHz clock signal to the clock input of up/down counter 312.

However, during the set-up procedure after the second sync pulse the OVS/Q/ output of flip-flop 307 is high thus providing a high input to terminal a of gate 356. Terminal b of gate 356 is connected to the output of gate 354. Terminal a of gate 354 is connected to the OVS/Q/ output of flip-flop 402 (the function of which will be explained below) which is high during the set-up procedure. Terminal b of gate 354 is connected to the output of inverter 350 and is low during the set-up procedure. Terminal b of gate 356 will therefore be high during set-up. Consequently, the output of gate 356 will be low thereby commanding a downcount to up/down counter 312.

In operation, set-up circuit 18 causes up/down counter 312: (1) to count up at the 10 kHz rate between the occurrence of the first and second sync pulses after power-on and (2) to count down at the 10 kHz rate for the time period set in simulator 330. By reference to FIG. 6 it will be noted that the time period set in shear simulator 330 is essentially the time between point 204 and 212 which is referred to as the shear response time. Zero crossover point 212 is, as will be explained, aligned with the sync pulse. Thus, the count in up/down counter 312, after being decremented by the shear response time represents the delayed start time between point 204a (the start of the next cycle) and the preceding sync pulse.

During operation of shear control circuit 10, after the set-up procedure has been completed, the outputs from set-up circuit 18 are such as to transfer control of the clock input to counter 312 to the return sensor signal.

Control of the count direction is transferred to the zero crossover and sync signals so that incrementing occurs if the zero crossover occurs before the sync and decrementing occurs if the zero crossover occurs after the sync in any one cycle. When the set-up procedure is completed the output from differentiator circuit 302 remains high as well as the output from shear simulator 330 and the OVS/Q/ output from flip-flop 307. The output of gate 308 is therefore low during operation thereby closing gate 309 and preventing the passage of the 10 kHz clock pulse during normal operation. Inverter 350 inverts the output from gate 308 and presents a high during normal operation at terminal a of gate 353, the reset terminal of counter 351 and terminal b of gate 354. Control of the direction of count in counter 312 is therefore essentially transferred to the zero crossover and sync signals by way of terminal a of gate 354.

The high output from differentiator circuit 302 is connected to terminal b of gate 370, terminal a of which is connected to the Q output of start delay flip-flop 372. The output of gate 370 is connected via line 373 to the reset terminals of up-counter 310 (including divide-by-ten counter 310e). Flip-flop 372 is set, and counter 310 is therefore enabled, by each sync pulse arriving on line 371. Counter 310 continues its upward count until it is reset by a high output from gate 370. Comparator 375 (including 4-bit comparators 375a, 375b, 375c and 375d) compares the counts in up/down counter 312 and up-counter 310 and produces a signal upon a comparison. The output of comparator 375 occurs at point 204 on graph 200 and is provided to shear valve direction control 28 for initiating shear movement. The output of comparator 375 goes through inverter 377 and into the clock terminal of start-delay flip-flop 372 thus causing a low Q output which produces a high output from gate 370 to reset up-counter 310.

During normal operation after the set-up procedure has been completed, up/down counter 312 is incremented or decremented as necessary in order to maintain its count within a predetermined narrow range. The direction of the count in up/down counter 312 is a function of the relationship between the zero crossover and sync signals. The zero crossover signal is received at the reset terminal of flip-flop 400 the Q output of which goes low upon the occurrence of a zero crossover signal. This Q output is connected to the data input of flip-flop 402 which, upon the occurrence at its clock terminal of the next sync pulse following this zero crossover signal, produces a high at its OVS/Q/ output causing a low at the output of gate 354 and a high at the output of gate 356 thus producing an up-count command to counter 312. (As previously stated the other input terminals to gates 354 and 356 are held high during normal operation.) The output of comparator 375 is connected via line 380 to the set terminal of flip-flop 400 and upon the occurrence of a comparison this flip-flop is set producing a high at its Q output, a high at the data input of flip-flop 402 and therefore a low at the OVS/Q/ output of flip-flop 402 upon the occurrence of the next sync pulse. This then produces a low or countdown command at the output of gate 356. Thus it will be noted that if the output of comparator 375 occurs before the next sync pulse at the clock terminal of flip-flop 402 a count-down command will result whereas if the sync pulse occurs before the comparison a count-up command will occur. Under ideal operating conditions indicator LED 405 will be lighted on every other shear cycle as the up and down commands are effected on alternate cycles to maintain the shear actuating signal (the output of comparator 375) within a predetermined narrow range about point 204 on graph 200. It will be thus understood that shear control circuit 10 tends to align the sync and zero crossover signals.

The actual count pulse which will be counted by up/down counter 312 in response to the up or down command on line 381 is derived from the return signal via line 206 into terminal b of gate 353. It will be recalled that the terminal a of gate 353 is held high during normal operation. Upon the occurrence of the return signal the output of gate 353 will go low thus producing a high at the output of gate 352 for the duration of the return signal. This is the single clockpulse that will be either incremented or decremented in each cycle in accordance with the command on line 381. To ensure that the 10 kHz output of counter 351 is not available during normal operation, inverter 350 provides a high at the reset terminal of counter 351.

Referring again to FIG. 9, a start pulse is initially obtained from a sensor 29 (best seen in FIG. 1) on some part of the machine with which shear control circuit 10 is intended to operate. For example, the start sensor may be mounted on the feeder cam of the feeder of a glassware manufacturing machine. The start pulse may be passed through an optical coupler 390 and a differentiator 391 and inverter 392. Differentiator 391 is not shown in detail since it may take any one of many forms well known to those of ordinary skill in the art. Differentiator 391 is defined herein by its function which is to produce a short negative pulse at the leading edge of its input pulse (i.e. the start pulse). The output of differentiator 391 is inverted by inverter 392 to produce the sync pulse used within shear control circuit 10.

Zero crossover sensor 84 produces a zero crossover output signal which is connected to optical coupler 393 and differentiator 394. Differentiator 394 is essentially identical to differentiator 391 and produces a short negative output pulse at the leading edge of the zero crossover pulse. This output is used by some portions of shear control circuit 10 and inverted by inverter 395 for use by other portions of the circuit.

Coincidence circuit 396 comprises gate 397 receiving the sync and zero crossover signals at its terminals b and a respectively. The output of gate 397 is connected to the clock terminal of flip-flop 398. Simultaneous occurrence of the sync and zero crossover produces a low output from gate 397 which sets flip-flop 398 on the trailing edge causing LED 399 to light. Flip-flop 398 is reset by the output of comparator 375 and thus made ready to light LED 399 during the next cycle. This flip-flop is used because the duration of the output pulse from gate 397 may be too short to make the light visible. Periodic lighting of LED 399 indicates proper operation of shear control circuit 10.

In normal operation it is desireable to provide a cushion on the return stroke of the shears to prevent their mechanical impact with the supporting structure. In prior art straight-line shears of the type disclosed in the aforementioned U.S. patent this cushion was controlled by complex array of pneumatic piping, valves, sensors and the like. Shear control circuit 10 provides a cushion control for the shears which is considerably less complex and more efficient then the prior art arrangement. Referring now to FIG. 10 a schematic of cushion control circuit 26 is shown connected to shear valve direction control 28. Circuit 26 receives an input from cushion sensor 75 (FIG. 5) which is aligned relative to the shear cycle to produce an output as shown in FIG. 6. The trailing edge of this output occurs at point 214 on the return stroke. As will be seen below cushion control circuit 26 provides time delay adjustments to assure the occurrence of a cushion actuating signal relative to point 214 at the proper time in the shear cycle.

The cushion sensor output goes through optical coupler 500 into the trigger terminal of analog cushion time delay circuit 502. Delay circuit 502 provides an adjustable range of time delays in the order of 1 to 55 ms. Upon the expiration of the selected time delay an output from cushion delay 502 serves as the trigger input to cushion valve limiter 506. Limiter 506 is also an analog time delay essentially identical to delay 502 except for the peripheral connections of its various terminals (not shown). Limiter 506 provides an output to energize cushion valve 508 for a predetermined fixed time period. Cushion valve 508 will be understood by those skilled in the art to control the exhaust of cylinder assembly 33. The delay in limiter 506 will rarely time out and limiter 506 will generally be turned off by a reset signal from shear valve direction control 28 on line 520. The purpose of limiter 506 is to prevent cushion valve 508 from being continuously energized. Limiter 506 is reset when cylinder assembly 33 is energized by shear valve direction control 28. Limiter 506 therefore acts like a flip-flop which is set by cushion delay 502 and reset by control 28. In actual operation, when shear control circuit 10 is aligned with a particular straight line shear assembly the time delay in cushion delay 502 may be emperically set in order to avoid mechanical impacts within the shear control assembly.

Shear valve direction control 28 comprises direction flip-flop 550, inverter 552 and shear valve 554. The shears are moved toward each other on the cutting stroke when flip-flop 550 is set and produces a low OVS/Q/ output which via inverter 552 causes a high input to shear valve 554. Valve 554 may be a common pneumatic valve which, when its solenoid (best seen in FIG. 13) is energized by this high input urges the piston of cylinder assembly 33 to move in one direction and when de-energized urges the piston to move in the opposite direction. Flip-flop 550 is set by the output of comparator 375 which is connected to its set terminal by line 560. The Q output of flip-flop 550 is connected to the reset terminals of limiter 506 via line 520 and overlap flip-flop 254 via line 522. These flip-flops are reset when the shears are energized. The clock terminal of flip-flop 550 is connected to the OVS/Q/ output of return delay flip-flop 210 via line 216. Flip-flop 550 is clocked and reset when flip-flop 210 is reset by the output of comparator 230 which thereby produces a high OVS/Q/ output from flip-flop 550 to de-energize shear valve 554. The reset terminal of flip-flop 550 will override the clock input in the event a shear lockout is required by lockout circuit 20.

Operation of shear control circuit 10 may be enhanced by making available to the operator certain parameters representative of its operation. Accordingly, in FIG. 11 there is shown a schematic of a display counter circuit 24 which enables an operator to view the start delay time, return delay time, cuts per minute or the differential time between the sync and the position of the plunger (in a glassware forming machine) feeding the material to be cut.

Display counter circuit 24 receives a pulse input on line 600 from plunger sensor 30 (best seen in FIG. 1), through optical coupler 602 into the clock terminal of flip-flop 604 which produces an output upon the occurrence of each plunger sensor signal. This output is connected by line 606 to terminal 608 of switch 610. Switch 610 also contains terminal 612 connected to the output of return delay flip-flop 210 via line 212 and terminal 614 connected to the output of start delay flip-flop 372 via line 615. It will be noted that flip-flop 604 is set by the plunger signal and reset by the sync connected to its reset terminal. Thus, the signal at terminal 608 will remain high for a time interval between the plunger down position and the start of the sync pulse which is defined as the differential time.

All of the terminals in switch 610 represent selectable time intervals which may be input to terminal a of gate 618. Display counter circuit 24 will either count these time intervals or the shear cuts per minute, which choice is dictated by interval/CPM switch 620 which, when open will produce a high at terminal b of gate 618. During a selected time interval terminal a of gate 618 goes high producing a low output which enables divide-by-10 counter 622. Counter 622 is clocked by the 100 kHz clock and its 10 kHz output is connected through inverter 624 to terminal b of AND gate 626 and will be on for the duration of the selected time interval. Terminal a of gate 626 is connected to contact 616 of switch 610. During the selected time interval a series of 10 kHz pulses will pass through appropriate matching circuitry (not shown) to count terminal 630 of display counter 632. As will be explained below this count is latched for display and the counter is reset to count again in the next cycle.

Latch terminal 662 of display counter 632 is triggered by the output of one-shot 660 and is also connected to delay line 664 to provide a gap between the latch signal and the reset signal. The output of delay line 664 is connected to reset terminal 665 which, when activated, resets the counter.

When switch 620 is open a high input is connected via line 621a and 621b to the reset terminal R of divide-by-3600 counter 650 and terminal b of gate 652, respectively. The output of counter 650 is therefore low and via inverter 653 presents a high input to terminal b of gate 654. Terminal a of gate 652 is connected via inverter 651 to the output of gate 370 which, it will be recalled, is low during the start delay time and high when the shears are triggered. The output of gate 652 thus is low during the start delay time and since it is connected to terminal a of gate 654, the output of gate 654, connected to the trigger terminal of one-shot 660, goes high. The latch occurs at the end of the start delay regardless of which time interval is counted by display counter circuit 24.

If switch 620 is closed a low input will be connected to terminals b of gates 618 and 652 and to the reset terminal of counter 650. Gate 618 is thus closed to prevent counting of the time intervals and counter 650 is enabled. The clock terminal of counter 650 is connected to the 60 Hz power line so the output of counter 650 to terminal b of gate 645 will be 1 pulse per minute. Terminal a of 654 is connected to gate 652 which has its terminal b connected to the low switch 620 and terminal a connected through an inverter 651 to the output of gate 370. Since terminal a of gate 652 will go low at the end of the start/delay time (upon the occurrence of an output from comparator 375) its output will go high thus opening gate 654 and enabling the 1 pulse per minute output of counter 650 to trigger one-shot 660. Display counter 632 is therefore latched once per minute. The count accumulated each minute is derived from any one of the time interval inputs into switch 610. Counter 622 is reset by delay line 664 thereby having a low output inverted by inverter 624 to provide a high input to terminal b of AND gate 626. Terminal a of gate 626 goes high only once per cycle regardless of the position of switch 610 and therefore the output of gate 626 that is counted by display counter 632 is one pulse per cycle. This provides an indication of shear cuts per minute assuming one cut per cycle.

Referring now to FIG. 12 there is shown a schematic of a lockout circuit 20 which is incorporated into shear control circuit 10 as a safety mechanism to prevent operation of the shears under certain conditions. Lockout circuit 20 contains count-to-lockout shift register 700 which receives sync pulses at its clock terminal. Upon the occurrence of each sync pulse shift register 700 will provide a cumulative output at its output terminals 1, 2, 3, and 4. However, gate 702 is provided to receive an input at its terminal b from the zero crossover signal, the output of gate 702 being connected to the reset terminal of shift register 700. During normal operation of shear control circuit 10 shift register 700 will be able to accumulate only a selected count (for example, one) at its output terminals prior to being reset. In the event that a malfunction occurs and a zero crossover signal does not occur in a cycle the count at the output terminals of shift register 700 will accumulate. Jumper 706 is provided to connect a selected one of the output terminals of shift register 700 to inverter 708. (Any number of incomplete cuts may be selected to trigger an output.) The output of shift register 700 is also connected via line 735 to the data input of set-up flip-flop 300. The output of inverter 708 is connected to terminal a of gate 709, terminal b of which is connected to the output of flip-flop 710. The reset terminal of flip-flop 710 is connected via inverter 712 to a "power-on" signal input.

The preferred embodiment disclosed herein is provided with a three position power switch (not shown): "off," "on" and "run." The "off" position removes all power from the shear control circuit 10. The "on" position powers up the logic circuits for initialization purposes. The "run" position provides a high "power-on" logic signal to inverter 712 (and to the clock terminal of set-up flip-flop 300 mentioned above).

When the power switch is "on" a low input signal is connected to inverter 712, the output of which goes high, resetting flip-flop 710 producing a low output therefrom. This produces a high output from gate 709 which is connected via line 730 to the reset terminal of direction flip-flop 550 (FIG. 10). This locks out the shears during the set-up procedure. When the power switch is "on" shift register 700 receives sync pulses at its clock terminal (assuming the feeder cam is operating) which quickly accumulate (there is no zero crossover signal at this time) to provide a selected high output which also locks out the shears. The high output of shift register 700 on line 735 to set-up flip-flop 300 prevents the set-up period from starting until the shears are locked out.

When the power switch is set to "run" a high "power-on" signal is provided to inverter 712 causing the reset terminal of flip-flop 710 to go low. Simultaneously, a high "power-on" signal is provided to the clock terminal of set-up flip-flop 300 to start the set-up procedure (the data terminal having been previously set high by the output of shift register 700). The end of the set-up period clocks flip-flop 710 by a high signal on line 720. This produces a high at terminal b of gate 709 although terminal a is still low because shift register 700 has been loaded up. Resetting shift register 700 by pushbutton 801 will provide a high at terminal a of gate 709 to start the shears by enabling direction flip-flop 550.

Terminals a and b of gate 709 are both high during normal operation unless a lockout signal occurs from shift register 700.

Terminal a of gate 702 is connected to preset/reset circuit 22. This circuit is used to reset shear control circuit 10 in the event of a lockout and also used to facilitate circuit operation. While these two functions may be performed by two separate controls, the use of a single bushbutton 801 accessible to the operator simplifies the circuitry with very little impact on efficiency.

Discussing first the reset feature of pushbutton 801, the pushbutton output is provided to terminal a of gate 802, the output of which is connected via line 804 to the terminal a of gate 702. Terminal b of gate 802 is connected via line 720 to the output of inverter 350 (best seen in FIG. 8) which is high during normal operation. When a lockout occurs, shift register 700 may be reset by pushbutton 801 which produces a low output from gate 802 and a low input to terminal a of gate 702.

Discussing now the facilitation of circuit operation it will be noted that the carryover terminals between two adjacent counters, 312a and 312b in up/down counter 312, are connected via lines 313a and 313b, respectively, to AND gate 808 to override the normal "carry" between these two counters. The carry output of counter 312a is connected to terminal a of gate 808 the output of which is provided to the carry input of counter 312b. During the time pushbutton 801 is energized, counters 312a and 312b will count simultaneously rather than consecutively causing up/down counter 312 to count 17 times as fast. A similar arrangement is provided by AND gate 820 for use with up/down counter 225 in return delay timer 14 and will therefore not be explained in detail. This can be done at any time after the set-up procedure in the event, for example, something happens requiring the counts in each counter to be quickly brought back to operating conditions. During the set-up procedure, pushbutton 801 is disabled by the low output from inverter 350 on line 720 causing the output of gate 802 to be high resulting in a shear lockout until the end of the set-up period when pushbutton 801 can start the shears.

Circuit 22 also contains means to preset or preload a count of 96 into up/down counter 225. This previously mentioned preload feature is achieved by connecting the output of gate 802 through leading edge differentiator circuit 830 and inverter 832 to the preset terminals of counter 225 via line 270. The negative pulse output of circuit 830 occurs when pushbutton 801 is pushed to start the shears. Inverter 832 then provides a positive input to the preload terminals of up/down counter 225.

Because of the use of one pushbutton for the performance of the reset and preset functions both up/down counter 225 and up/down counter 312 will increment or decrement 17 times as fast whenever the pushbutton overrides a lockout. This throws up to a 17 count error into both counters which may be overcome at the rate of one count pulse per shear cycle when the pushbutton is de-energized.

The relationship between the invention and the shear assembly may be understood with reference to FIGS. 13a, b, c and d which diagrammatically show various stages in the operation of cylinder assembly 33. FIG. 13a shows the position of cylinder assembly 33 with the shears at rest. Shear valve 554 and cushion valve 508 are pneumatically interconnected and electrically activated by their solenoids 554a and 508a, respectively.

Valves 554 and 508 may be 4/2 type valves each having four ports and two positions. Each valve has an inlet port and an exhaust port. When the valve solenoid is not energized each valve has its inlet connected to port B and exhaust connected to port A. Port B of valve 554 is connected to cylinder 33 via line 33a and port B of valve 508 is connected thereto via line 33b. Port A of valve 554 is connected to the inlet of valve 508 which has its port A plugged. A pilot air line is connected between both valves as shown.

With the shears at rest the relative positions of cylinder assembly 33 and valves 554 and 508 is as shown in FIG. 13A. Both solenoids are de-energized and air is directed through port B of valve 554 to hold the cylinder plunger retracted. FIG. 13b shows the situation at the end of the start delay time when solenoid 554a is energized to initiate the cut stroke. Air is directed through port A of valve 554 to valve 508 and into line 33b. FIG. 13c shows the situation at the end of return delay time 215 when solenoid 554a is de-energized. Air is directed through port B of valve 554 to slow the cylinder plunger and eventually reverse its direction. The other side of the plunger is open to atmospheric pressure via the exhaust and A ports of valve 554 and the inlet and B ports of valve 508. FIG. 13d shows the situation during the return stroke when cushion valve limiter 506 activates cushion valve 508 by energizing solenoid 508a to direct exhaust air through port B and the exhaust port of valve 508. A needle valve 509 may be interposed in the exhaust line to regulate exhaust air.

Those skilled in the art will understand that numerous modifications may be made in the preferred embodiment of the invention disclosed herein without departing from the spirit and scope thereof. Moreover, it will be understood that this invention may be embodied in the form of a microprocessor or other computer based control system integrated with appropriate interfacing components.

What is claimed is:

1. A control system for controlling cyclical motion of a fluidically driven member, said member for being moved in a first direction by energizing an energizing means at one point in each cycle and in a second direction at another point in each cycle by reversing said energizing means, said control system comprising:
   means for producing a start signal output at a predetermined first time in each cycle;
   means responsive to said start signal for energizing said energizing means;
   means for sensing the position of said member and for producing a first signal output when said member is at a first predetermined position in each cycle;
   means responsive to said first signal output and operatively connected to said energizing means for producing a delayed second signal output at a predetermined second time for reversing said energizing means, said predetermined second time occurring while said member is moving in said first direction.

2. A control system according to claim 1 further comprising:
   means for sensing the position of said member and for producing a third signal output if said member is at a second predetermined position in each cycle;
   means responsive to said third signal output for adjusting said predetermined second time by a first predetermined amount in response to an occurrence of said third signal output and for adjusting said predetermined second time by a second predetermined amount in response to a non-occurrence of said third signal output.

3. A control system for controlling cyclical motion of a fluidically driven member, said member for being moved in a first direction by energizing an energizing means at one point in each cycle and in a second direction at another point in each cycle by reversing said energizing means, said control system comprising:
   means for producing a sync signal at a predetermined first time in each cycle;
   means responsive to said sync signal for producing a start signal output at a predetermined second time in each cycle;
   means responsive to said start signal for energizing said energizing means;
   means for sensing the position of said member and for producing a first signal output when said member is at a first predetermined position in each cycle;
   means for determining which of said first signal and sync signal occurs first in each cycle;
   means responsive to said first signal output and said sync signal for adjusting said predetermined second time by a first predetermined amount in response to said first signal output occurring before said sync signal and for adjusting said predetermined second time by a second predetermined amount in response to said first signal occurring after said sync signal.

4. A method for controlling cyclical motion of a fluidically driven member, said member for being moved in a first direction by energizing an energizing means at one point in each cycle and in a second direction at another point in each cycle by reversing said energizing means, said method comprising the steps of:
   a. energizing said energizing means to move said member in said first direction at a predetermined first time relative to a start signal;
   b. sensing a second time when said member is at a first predetermined position in its cycle;
   c. determining a delay time period after said second time;
   d. reversing said energizing means upon the expiration of said delay time period;
   e. repeating steps a through d.

5. A method according to claim 4 further comprising the steps of:
   f. determining if said member arrives at a second predetermined position;
   g. producing a first signal output if said member arrives at said second predetermined position;
   h. adjusting said delay time period by a first predetermined amount in the event said first signal is not produced or adjusting said delay time period by a second predetermined amount in the event said first signal is produced;
   i. repeating steps a through h.

6. A method for controlling cyclical motion of a fluidically driven member, said member for being moved in a first direction by energizing an energizing means at one point in each cycle and in a second direction at another point in each cycle by reversing said energizing means, said method comprising the steps of:
   a. producing a sync signal in each cycle;
   b. determining a time period between the occurrence of said sync signal and a start time;
   c. energizing said energizing means to move said member in said first direction at said start time at the expiration of said time period;

d. sensing the occurrence of said member at a first predetermined position and producing a first signal upon said occurrence;

e. determining which of said sync signal or first signal occurs first in each cycle;

f. adjusting said time period a first predetermined amount in the event said sync signal occurs before said first signal or adjusting said time period a second predetermined amount in the event said sync signal occurs after said first signal;

g. repeating steps a through f.

7. A control system for controlling the cyclical operation of fluidically driven shears comprising:

means for producing a start signal output at a predetermined first time in each cycle;

means responsive to said start signal for energizing said shears;

return sensor means for sensing the position of at least one of said shears and for producing a return signal output when said shears are at a first predetermined position in each cycle;

return timer means responsive to said return signal output and operatively connected to said energizing means for producing a return delay signal output at a predetermined second time for reversing said energizing means, said predetermined second time occuring while said shears are moving toward each other.

8. In a control system according to claim 7, a sensor interface for sensing a predetermined position of at least one shear in each cycle and for producing predetermined signal output for said control system, said interface comprising:

at least one sensor vane having an axis;

means secured to said sensor vane and to at least a first one of said shears for translating the oscillatory motion of said first one of said shears to an oscillatory motion of said vane about said axis;

and the return sensor means, said return sensor means comprising means for sensing a first predetermined angular position of said sensor vane and for producing said signal output upon the occurrence of said vane at said first angular position, said first predetermined angular position corresponding to the first predetermined position in each cycle of said first one of said shears.

9. A sensor interface according to claim 8 wherein said sensor vane comprises:

a solid flat arcuate surface secured at a predetermined radius from said axis, said surface having a first radially extending edge at one end thereof and a second radially extending edge at the other end thereof.

10. A sensor interface according to claim 9 further comprising:

a plurality of sensor means, each sensor means fixedly secured at a respective predetermined angular position relative to said axis for sensing the occurrence of at least one of said radially extending edges at its respective predetermined angular positions and for producing a predetermined signal output for said control system.

11. A control system for controlling the cyclical operation of shears comprising:

sync means for providing a synchronizing signal in each cycle of operation of said shears, said synchronizing signal occuring at a predetermined first time in each cycle;

start timer means responsive to said synchronizing signal for producing a start signal output at a predetermined second time in each cycle;

means responsive to said start signal for energizing said shears to cause them to move toward each other;

return sensor means for sensing the position of at least one of said shears and for producing a return signal output when said shears are at a first predetermined position in each cycle;

return timer means responsive to said return signal output and operatively connected to said energizing means for producing a return delay signal output at a predetermined third time for reversing said energizing means, said predetermined third time occuring while said shears are moving toward each other.

12. A control system according to claim 11 wherein said return timer means comprises:

first counting means for establishing a predetermined return delay time and for providing an output therefrom;

second counting means for determining a first elapsed time after the occurrence of said return signal output and for providing an output therefrom;

first comparator means for comparing the outputs of said first and second counting means and for producing said return delay signal output when said first elapsed time equals said return delay time.

13. A control system according to claim 12 further comprising:

overlap sensor means for sensing the position of at least one of said shears and for producing an overlap signal output when said shears are at a second predetermined position in said cycle;

first adjusting means responsive to said overlap signal output for adjusting said predetermined return delay time.

14. A control system according to claim 13 wherein said first adjusting means further comprises:

means for producing a first clock pulse in each cycle;

means for providing said first clock pulse to said first counting means at a predetermined first point in each cycle;

means responsive to said overlap signal output for causing said first counting means (1) to increment the count therein by said first clock pulse in the event said overlap signal output does not occur and (2) to decrement the count therein by said first clock pulse in the event said overlap signal output does occur.

15. A control system according to claim 14 wherein said first clock pulse producing means is said return sensor means and said first clock pulse is said return signal output.

16. A control system according to claims 11 or 14 wherein said start timer means comprises:

third counting means for establishing a predetermined start delay time and for providing an output therefrom;

fourth counting means for determining a second elapsed time after the occurrence of said synchronizing signal and for providing an output therefrom;

second comparator means for comparing the outputs of said third and fourth counting means and for producing said start signal output when said second elapsed time equals said start delay time.

17. A control system according to claim 16 wherein said start timer means further comprises:
- zero crossover sensor means for sensing the position of at least one of said shears and for producing a zero crossover signal output when said shears are at a third predetermined position in said cycle;
- second adjusting means responsive to said zero crossover signal output and said synchronizing signal for adjusting said predetermined start delay time.

18. A control system according to claim 17 wherein said second adjusting means further comprises:
- means for providing a second clock pulse to said third counting means at a predetermined second point in each cycle;
- means for determining which of said zero crossover signal and said synchronizing signal occurs first in each cycle;
- means responsive to said synchronizing signal and said zero crossover signal for causing said third counting means to increment said predetermined start delay time by said second clock pulse in response to said zero crossover signal occurring before said synchronizing signal and for causing said third counting means to decrement said predetermined start delay time by said second clock pulse in response to said zero crossover signal occurring after said synchronizing signal.

19. A control system according to claim 18 wherein said second clock pulse providing means is said return sensor means and said second clock pulse is said return signal output.

20. A control system according to claims 11 or 14 further comprising:
- cushion sensor means for sensing the position of at least one of said shears and for producing a cushion signal output when said shears are at a fourth predetermined position in each cycle;
- means responsive to said cushion signal output for cushioning the return stroke of said shears.

21. A control system according to claim 20 further including a lockout circuit comprising:
- means for determining the number of sync signals occurring between two consecutive zero crossover output signals;
- means responsive to said determining means for providing an inhibit signal to said energizing means upon the occurrence of a predetermined number of sync signals between two consecutive zero crossover output signals to prevent energization of said energizing means.

22. A control system in accordance with claim 21 further comprising:
- display counter means operatively interconnected with said predetermined second time and said predetermined third time to selectively display either said second or third time.

23. A control system in accordance with claim 22 further comprising:
- means to determine the number of cycles in a unit of time;
- means operatively interconnecting said determining means and said display counter means to display said number of cycles.

24. A method for controlling the operation of fluidically driven shears responsive to a cyclical sync signal, said method comprising the steps of:
- a. energizing said shears toward each other at a predetermined first time relative to said sync signal;
- b. sensing a second time when at least one of said shears is at a first predetermined position in its cycle;
- c. determining a return delay time period after said second time;
- d. reversing said shears upon the expiration of said return delay time period to urge said shears away from each other, said expiration of said return delay time occuring while said shears are moving toward each other;
- e. repeating steps a through d.

25. A method according to claim 24 further comprising the steps of:
- f. sensing the occurrence of a predetermined overlap of said shears;
- g. producing a first signal output upon the occurrence of said overlap;
- h. adjusting said return delay time period by a first predetermined amount in the event said first signal is not produced or adjusting said return delay time period by a second predetermined amount in the event said first signal is produced;
- i. repeating steps a through h.

26. A method according to claim 25 further comprising the steps of:
- j. sensing the occurrence of the zero crossover point of said shears;
- k. producing a second signal upon the occurrence of said zero crossover point;
- l. determining if said second signal occurs before, after or concurrently with said sync signal;
- m. adjusting said predetermined first time by a third predetermined amount in the event said second signal occurs before said sync signal or adjusting said predetermined first time by a fourth predetermined amount in the event said second signal occurs after said sync signal;
- n. repeating steps a through m.

27. A method according to claim 26 further comprising the steps of:
- o. sensing the occurrence of a second predetermined position of said shears on the return stroke thereof;
- p. producing a third signal upon the occurrence of said second predetermined position;
- q. energizing a cushion means in response to said third signal to cushion said shears on said return stroke,
- r. repeating steps a through q.

28. A method according to claim 26 further comprising the steps of:
- initializing said predetermined first time prior to said adjustment by following a set-up procedure comprising the steps of:
  - a. producing clock pulses at a predetermined rate;
  - b. sensing the occurrence of first and second consecutive ones of said sync signals;
  - c. beginning the accumulation of said clock pulse in a counter upon the occurrence of said first sync signal and ceasing same upon the occurrence of said second sync signal;
  - d. providing a predetermined shear response time interval;
  - e. decrementing said accumulated count at said predetermined rate after said second sync signal during said time interval whereby the resultant count in said counter is said predetermined first time;
  - f. preventing said clock pulse from being incremented or decremented in said counter at said predetermined rate after the expiration of said time interval.

* * * * *

UNITED STATES PATENT AND TRADEMARK OFFICE
CERTIFICATE OF CORRECTION

PATENT NO. : 4,467,431

DATED : August 21, 1984

INVENTOR(S) : E. B. Gardner et al.

It is certified that error appears in the above-identified patent and that said Letters Patent is hereby corrected as shown below:

Col. 8, line 28 - "30" should read --330--
Col. 14, line 9 - "bushbutton" should read --pushbutton--

Signed and Sealed this

Eighth Day of January 1985

[SEAL]

Attest:

GERALD J. MOSSINGHOFF

Attesting Officer

Commissioner of Patents and Trademarks